US011953052B2

(12) United States Patent
Chen et al.

(10) Patent No.: US 11,953,052 B2
(45) Date of Patent: Apr. 9, 2024

(54) FASTENER AND HOUSING DEVICE INCLUDING THE FASTENER

(71) Applicant: PEGATRON CORPORATION, Taipei (TW)

(72) Inventors: Jian-Hua Chen, Taipei (TW); Po-Tsung Shih, Taipei (TW); Yu-Wei Lin, Taipei (TW); Ming-Hua Ho, Taipei (TW); Chih-Hao Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 345 days.

(21) Appl. No.: 17/350,361

(22) Filed: Jun. 17, 2021

(65) Prior Publication Data

US 2022/0034342 A1 Feb. 3, 2022

(30) Foreign Application Priority Data

Jul. 30, 2020 (TW) .................................. 109125709

(51) Int. Cl.
*F16B 5/06* (2006.01)
*F16B 21/07* (2006.01)

(52) U.S. Cl.
CPC .......... *F16B 5/0628* (2013.01); *F16B 21/073* (2013.01)

(58) Field of Classification Search
CPC ....... B60R 13/0206; B60R 13/04; F16B 2/06; F16B 5/0216; F16B 5/0225; F16B 5/0233;

(Continued)

(56) References Cited

U.S. PATENT DOCUMENTS 3,551,963 A * 1/1971 Mosher .............. A44B 17/0029
24/662
7,059,022 B2 * 6/2006 Yuta .................... B60R 13/0206
24/297

(Continued)

FOREIGN PATENT DOCUMENTS

CN 200961605 Y 10/2007
CN 201416593 Y 3/2010

(Continued)

OTHER PUBLICATIONS

Office Action issued in corresponding TW application No. 109125709 dated Jun. 9, 2021 (8 pages).

(Continued)

*Primary Examiner* — Josh Skroupa
(74) *Attorney, Agent, or Firm* — MUNCY, GEISSLER, OLDS & LOWE, PC

(57) ABSTRACT

A fastener is adapted for assembling a first housing to a second housing. The first housing is provided with a protruding portion and a buckling portion, and the second housing has a first surface, a second surface, and a through hole. The fastener includes a first portion, at least one connecting portion, at least two elastic portions, and a second portion. The first portion movably abuts against the first surface and has a first opening. The connecting portion is accommodated in the through hole. One end of the connecting portion is connected to the first portion. The connecting portion is spaced apart from an inner edge of the second housing by a gap. The two elastic portions inclinedly extend into the first opening. The second portion movably abuts against the second surface and is disposed at the another end of the connecting portion.

11 Claims, 5 Drawing Sheets

(58) Field of Classification Search
CPC .... F16B 5/0241; F16B 5/0258; F16B 5/0657; F16B 5/123; F16B 5/126; F16B 21/073; F16B 21/10; F16B 2200/406; Y10T 24/44017; Y10T 24/45775; Y10T 24/45874; Y10T 403/32; Y10T 403/32114; Y10T 403/32131; Y10T 403/32147; Y10T 403/32155; Y10T 403/32196; Y10T 403/32213
USPC ........ 403/52, 66, 68, 70, 71, 76, 78; 24/457, 24/662, 681
See application file for complete search history.

(56) References Cited

U.S. PATENT DOCUMENTS

| | | | | |
|---|---|---|---|---|
| 8,322,001 | B2 | 12/2012 | Ehrhardt et al. | |
| 8,424,173 | B2* | 4/2013 | Shiba | F16B 5/065 |
| | | | | 24/297 |
| 8,776,326 | B2* | 7/2014 | Clarke | B60R 13/0206 |
| | | | | 24/297 |
| 10,124,742 | B2* | 11/2018 | Martinez | F16B 21/073 |
| 2006/0280579 | A1* | 12/2006 | Seidl | F16B 5/0233 |
| | | | | 411/546 |
| 2016/0319855 | A1 | 11/2016 | Watanabe | |
| 2018/0186305 | A1* | 7/2018 | Kanie | B60R 13/0206 |
| 2020/0332819 | A1* | 10/2020 | Matthes | B60R 13/0206 |

FOREIGN PATENT DOCUMENTS

| | | | | |
|---|---|---|---|---|
| DE | 102005001424 | A1 * | 8/2006 | ............ F16B 5/0258 |
| DE | 102009032583 | A1 * | 1/2011 | ......... B60R 13/0206 |
| DE | 102013008503 | A1 | 11/2014 | |
| DE | 102017113566 | A1 * | 12/2018 | .............. F16B 5/123 |
| DE | 102017124887 | A1 * | 4/2019 | .............. F16B 5/123 |
| EP | 3248843 | A1 * | 11/2017 | ......... B60R 13/0206 |
| EP | 3444485 | A1 * | 2/2019 | ............ F16B 21/073 |
| FR | 3003910 | A1 | 10/2014 | |
| FR | 3079569 | A1 * | 10/2019 | ............ F16B 21/073 |
| JP | 6351163 | B2 | 7/2018 | |
| TW | 1544851 | B | 8/2016 | |
| WO | WO-2012013592 | A1 * | 2/2012 | ......... B60R 13/0206 |
| WO | WO-2012142369 | A1 * | 10/2012 | ......... B60R 13/0206 |

OTHER PUBLICATIONS

European Search Report dated Dec. 16, 2021 in EP Application No. 21184082.2 , 9 pages.

* cited by examiner

FASTENER AND HOUSING DEVICE INCLUDING THE FASTENER

CROSS-REFERENCE TO RELATED APPLICATION

This application claims the priority benefit of Taiwan application serial no. 109125709, filed on Jul. 30, 2020. The entirety of the above-mentioned patent application is hereby incorporated by reference herein and made a part of this specification.

BACKGROUND

Technical Field

The present disclosure relates to a fastener, and in particular, to a fastener with self-aligning positioning for assembling two housings and a housing device including the fastener.

Related Art

A fastener is usually configured to assemble two housings. A common practice is to dispose a hook at a predetermined position on a first housing and dispose a slot at a corresponding position on a second housing. During assembling of the first housing and the second housing, an operator first aligns the hook to the slot, and then applies a slight force to hook the hook to the slot, thereby assembling the first housing and the second housing. The hook and the slot may each be a part of the first housing and the second housing, or may be respectively locked to the predetermined positions on the first housing and the second housing.

Sometimes sizes of the first housing and the second housing may change due to a rise or a drop in temperatures, for example. In this case, the hook or the slot may deviate from respective original predetermined relative positions, causing a failure in alignment during the assembling. As a result, poor assembling quality of the housings or even damage to the housings is caused.

SUMMARY

The present disclosure provides a fastener. The fastener is adapted for assembling a first housing and a second housing. The first housing is provided with a protruding portion and a buckling portion. The buckling portion is located at an end of the protruding portion, and the second housing has a first surface, a second surface, and a through hole. The second surface is opposite to the first surface, and the through hole passes through the first surface and the second surface. The fastener is disposed at the second housing corresponding to the through hole. The fastener includes a first portion, at least one connecting portion, at least two elastic portions, and a second portion. The first portion movably abuts against the first surface and has a first opening. The first opening is in communication with the through hole. The connecting portion is accommodated in the through hole. One end of the connecting portion is connected to the first portion. The connecting portion is spaced apart from an inner edge of the second housing by a gap, and the fastener is movable in the through hole relative to the inner edge of the second housing to change relative positions of the fastener and the inner edge of the second housing. The two elastic portions inclinedly extend into the first opening from the first portion. The second portion movably abuts against the second surface and is disposed at another end of the connecting portion. The second portion and the first portion are jointly clamped on the second housing. During assembling of the first housing to the second housing, the buckling portion pushes the fastener to move along the gap, the first opening is aligned to the buckling portion, the buckling portion is allowed to pass through the elastic portions, and after the buckling portion passes through the elastic portions, the elastic portions return and are clamped on the protruding portion.

In an embodiment, the connecting portion and the second portion may be integrally formed.

In an embodiment, the another end of the connecting portion is a hook portion, and the second portion further has a second opening. The hook portion is adapted for being hooked to an inner edge of the second portion through the second opening.

In an embodiment, the second portion further includes at least one groove located at the second opening, and the hook portion is hooked to the second portion through the groove.

In an embodiment, the first portion and the second portion are made of different materials.

In an embodiment, the second housing further has a guide groove. The guide groove is in communication with the through hole and is adapted for allowing the at least one connecting portion to laterally access the through hole, and the first portion and the second portion are jointly clamped on the second housing.

The present disclosure further provides a housing device. The housing device includes a first housing, a second housing, and a fastener. The first housing is provided with a protruding portion and a buckling portion. The buckling portion is located at an end of the protruding portion. The second housing has a first surface, a second surface, and a through hole. The second surface is opposite to the first surface, and the through hole passes through the first surface and the second surface. The fastener is disposed at the second housing corresponding to the through hole. The fastener includes a first portion, at least one connecting portion, at least two elastic portions, and a second portion. The first portion movably abuts against the first surface and has a first opening. The first opening is in communication with the through hole. The connecting portion and is accommodated in the through hole, and one end of the connecting portion is connected to the first portion. The connecting portion is spaced apart from an inner edge of the second housing by a gap, and the fastener is movable in the through hole relative to the inner edge of the second housing to change relative positions of the fastener and the inner edge of the second housing. The two elastic portions inclinedly extend into the first opening from the first portion. The second portion movably abuts against the second surface and is disposed at the another end of the connecting portion. The second portion and the first portion are jointly clamped on the second housing. During assembling of the first housing to the second housing, the buckling portion pushes the fastener to move along the gap, the first opening is aligned to the buckling portion, the buckling portion is allowed to pass through the elastic portions, and after the buckling portion passes through the elastic portions, the elastic portions return and are clamped on the protruding portion.

According to the fastener and the housing device including the fastener of the present disclosure, since the connecting portion is spaced apart from the inner edge of the second housing by a gap, a position of the fastener relative to the second housing may be slightly adjusted during assembling to be aligned to a position of the buckling portion on the first housing during assembling, thereby resolving a problem that the buckling portion of the housing cannot be aligned to the fastener as a result of a deviated position.

DETAILED DESCRIPTION OF THE EMBODIMENTS

Figure 1A:
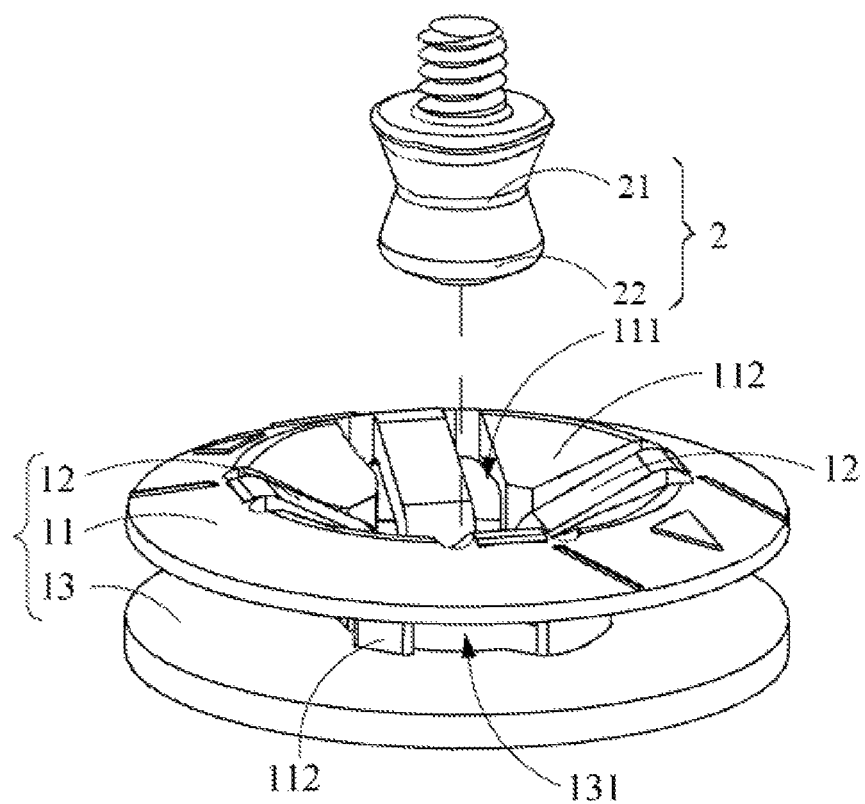
FIG. 1A is a three-dimensional schematic view showing a fastener and a fixing member according to an embodiment of the present disclosure.
Figure 1B:
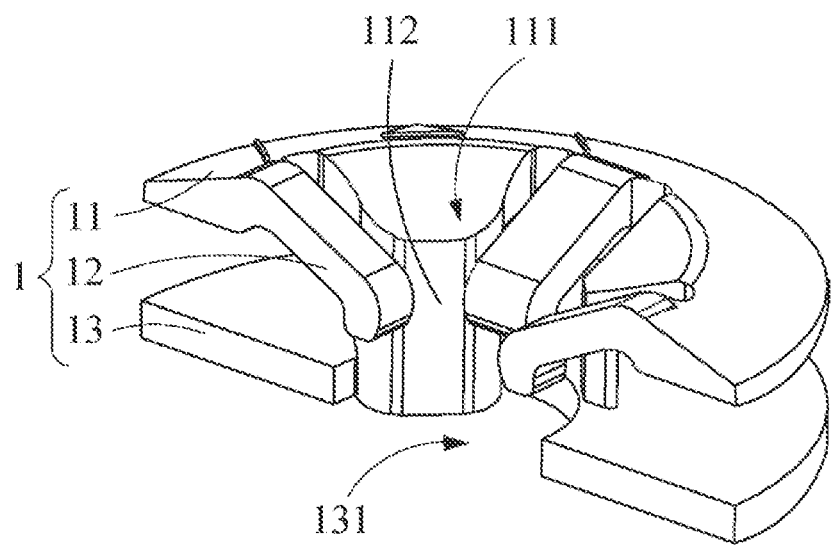
FIG. 1B is a three-dimensional cross-sectional view of the fastener shown in FIG. 1A along a direction.
Figure 1C:
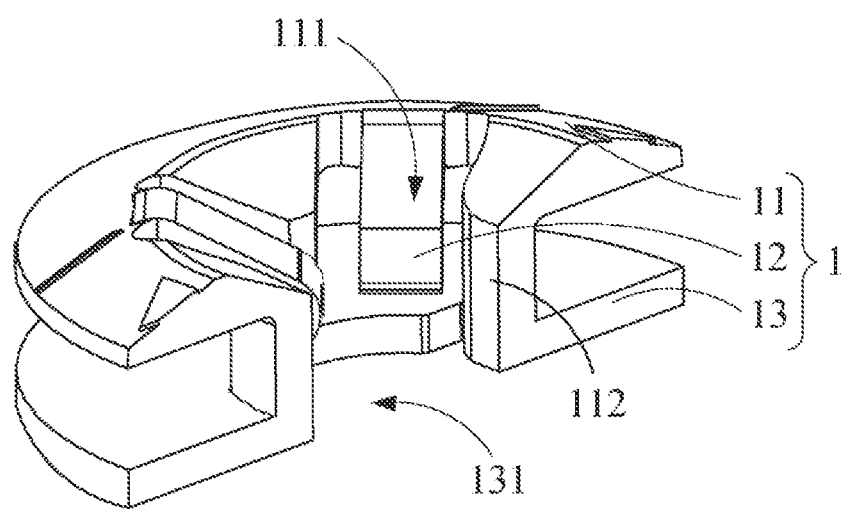
FIG. 1C is a three-dimensional cross-sectional view of the fastener shown in FIG. 1A along another direction.

As shown in FIG. 1A to FIG. 1C, the fastener 1 includes a first portion 11, at least one connecting portion 112, two elastic portions 12, and a second portion 13. In this embodiment, the amount of the connecting portion 112 is four, but not limited to. In other embodiments, the amount of the connecting portion 112 may be greater than or equal to 1. The first housing 4 as shown in FIG. 2B includes a fixing 2. The fixing member 2 includes a protruding portion 21 and a buckling portion 22. That is, the first housing 4 is provided with the protruding portion 21 and the buckling portion 22. The buckling portion 22 is located at an end of the protruding portion 21. FIG. 1B and FIG. 1C are three-dimensional cross-sectional views of the fastener 1 shown in FIG. 1A in different directions, which are intended to facilitate understanding of a three-dimensional structure of the fastener 1 shown in FIG. 1A.

The first portion 11 may be a circular plate shape. A first opening 111 is provided at a central position of the first portion 11, and the first opening 111 may be a circular opening. The four connecting portions 112 are symmetrically disposed at an inner edge of the first portion 11 and extend toward the second portion 13. One end of each of the connecting portions 112 is connected to the first portion 11, and another end is disposed at the second portion 13. The second portion 13 may also be a circular plate shape. The second portion 13 further includes a second opening 131. The second opening 131 is provided at a central position of the second portion 13, the second opening 131 may be a circular opening, and the first opening 111 is in communication with the second opening 131.

The two elastic portions 12 are symmetrically disposed at the inner edge of the first portion 11 and inclinedly extend into the first opening. In other words, the two elastic portions 12 and the four connecting portions 112 are disposed around the first opening 111. In this embodiment, the first portion 11, the connecting portion 112, the elastic portion 12, and the second portion 13 are integrally formed and may be made of the same material.

Figure 2A:
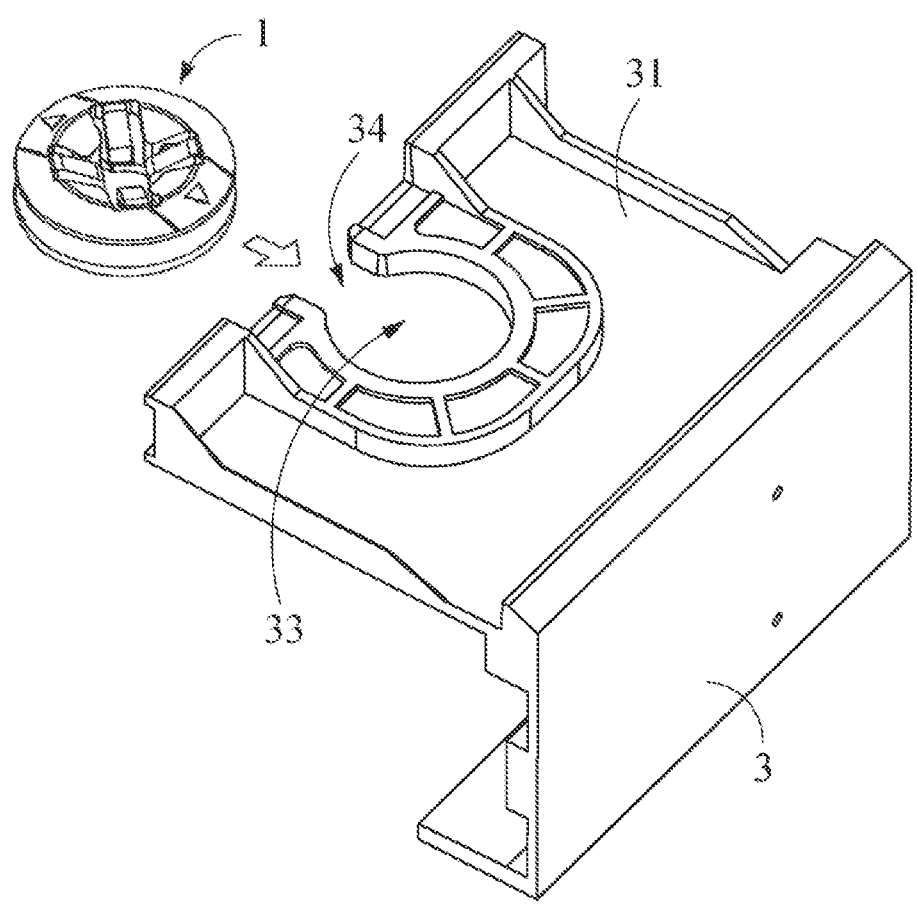
FIG. 2A is a three-dimensional schematic view showing a process of assembling the fastener in FIG. 1A to a second housing.
Figure 2B:
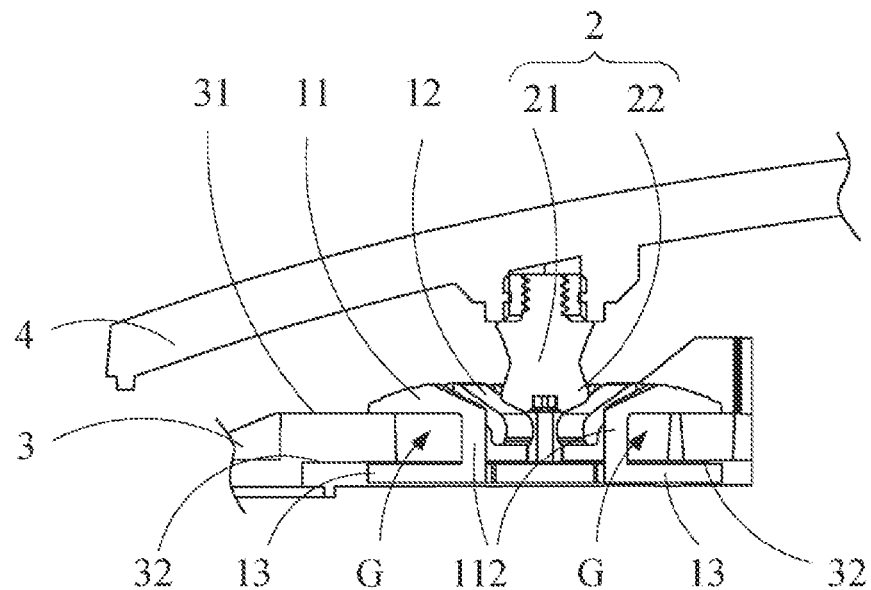
FIG. 2B is a cross-sectional view showing a process of assembling a housing device according to an embodiment of the present disclosure.
Figure 2C:
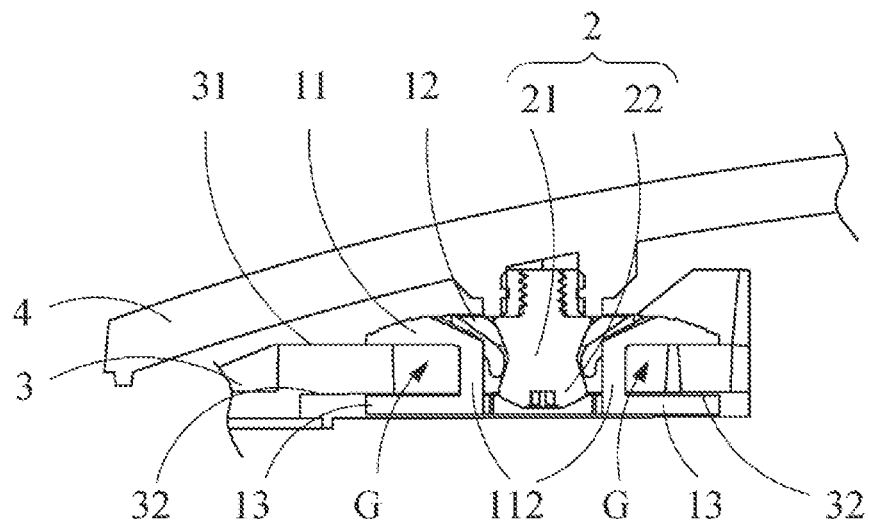
FIG. 2C is a cross-sectional view showing a process of assembling a housing device according to an embodiment of the present disclosure.

Referring to FIG. 2A to FIG. 2C, in this embodiment, the housing device includes a first housing 4, a second housing 3, and a fastener 1. The fastener 1 is assembled to the second housing 3, and the fixing member 2 is screwed to the first housing 4. In other embodiments, the fixing member 2 may be integrally formed with the first housing 4. The second housing 3 has a first surface 31 facing the first housing 4, a second surface 32 opposite to the first surface 31, a through hole 33 passing through the first surface 31 and the second surface 32, and a guide groove 34 in communication with the through hole 33. The fastener 1 is disposed at the second housing 3 corresponding to the through hole 33, the first portion 11 movably abuts against the first surface 31, and the first opening 111 in communication with the through hole 33. The connecting portion 112 is accommodated in the through hole 33, and the connecting portion 112 is spaced apart from an inner edge of the second housing 3 by a gap G, so that the fastener is movable in the through hole 33 relative to the inner edge of the second housing 3 to change relative positions of the fastener 1 and the inner edge of the second housing 3. The second portion 13 movably abuts against the second surface 32 to be jointly clamped on the second housing 3 with the first portion 11.

During assembling, the fastener 1 accesses the guide groove 34 along an arrow direction in FIG. 2A. The guide groove 34 is adapted for allowing at least one connecting portion 112 to laterally access the through hole 33, so that the through hole 33 is in communication with the first opening 111 and the second opening 131. The first portion 11 of the fastener 1 is in contact with the first surface 31, and the second portion 13 is in contact with the second surface 32, that is, the first portion 11 and the second portion 13 are jointly clamped on the second housing 3. The connecting portion 112 passes through the through hole 33 and is spaced apart from an inner edge of the through hole 33 by a gap G. The design of the structure enables the fastener 1 to move relative to the inner edge of the through hole 33 to change the relative positions of the fastener 1 and the through hole 33, and enables the buckling portion 22 to be aligned to a center of the first opening 111.

During assembling of the first housing 4 to the second housing 3, the buckling portion 22 pushes the fastener 1 to move along the gap G. The first opening 111 is aligned to the buckling portion 22, and the buckling portion 22 is allowed to pass through the elastic portions 12. After the buckling portion 22 passes through the elastic portions 12, the elastic portions return and are clamped on the protruding portion 21. Specifically, during assembling of the first housing 4 to the second housing 3, as shown in FIG. 2B, the fixing member 2 screwed to the first housing 4 moves toward the first opening 111. After contacting the elastic portion 12 that is inclinedly disposed, the buckling portion 22 starts to push the elastic portion 12 outward. In this case, the elastic portion 12 is slightly elastically deformed, so that the buckling portion 22 can pass. After the buckling portion 22 passes through the elastic portions, as shown in FIG. 2C, the elastic portions 12 return and are clamped on the protruding portion 21 whose width is less than that of the buckling portion 22. By the above-mentioned cooperation between the fastener 1 and the fixing member 2, the first housing 4 can be assembled to the second housing 3.

Since the fastener 1 can be moved in a small range in the through hole 33 relative to the second housing 3, and the elastic portion 12 is designed to be oblique, a problem of position deviation of the first housing 4 or the second housing 3 as a result of factors such as a temperature can be resolved. Specifically, when the fixing member 2 passes through the first opening 111 and the buckling portion 22 pushes the elastic portion 12, if the buckling portion 22 is not aligned to a central axis of the fastener 1, forces applied to the two elastic portions 12 are different. In this case, horizontal components of the two different forces cause the fastener 1 to move horizontally relative to the second housing 3 within a range of the gap G until the fixing portion 2 is aligned to the central axis of the fastener 1. After the fixing member 2 is aligned to the central axis of the fastener 1, the forces applied to the two elastic portions 12 are substantially equal, and the fastener 1 stops moving. By virtue of the design, the fastener 1 can be automatically aligned to the fixing member 2, resolving the problem of position deviation of the fixing member 2 of the first housing 4.

Figure 3A:
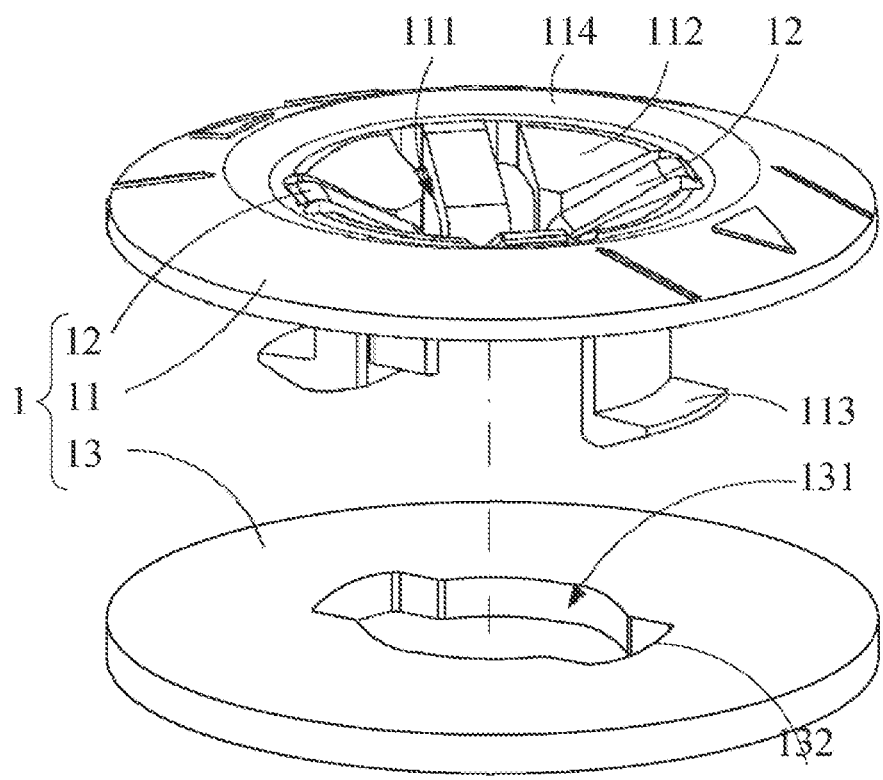
FIG. 3A is a three-dimensional schematic view showing a fastener according to another embodiment of the present disclosure.
Figure 3B:
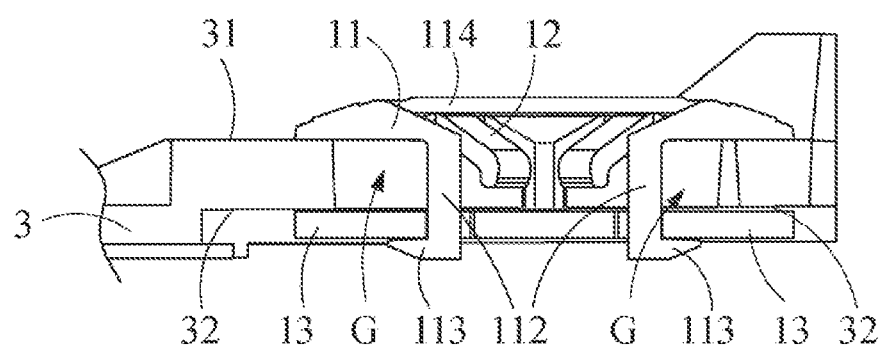
FIG. 3B is a schematic cross-sectional view showing the fastener according to the another embodiment of the present disclosure assembled to the second housing.

In another embodiment, the another end of the connecting portion 112 may be a hook portion 113. The hook portion 113 is adapted for being hooked to the inner edge of the second portion 13 through the second opening 131. The second portion 13 further includes at least one groove 132 located at the inner edge of the second opening 131. The hook portion 113 is hooked to the second portion 13 through the groove 132. Specifically, referring to FIG. 3A and FIG. 3B, in this embodiment of the present disclosure, the two connecting portions 112 and the second portion 13 may not be integrally formed, and the two connecting portions 112 are hooked to an inner edge of the second opening 131 by using the hook portion 113. Two grooves 132 formed at the inner edge of the second opening 131 are disposed correspondingly to the positions of the two hook portions 113, respectively. The two hook portions 113 may be respectively hooked to the second portion 13 in the corresponding grooves 132, and the hook portion 113 is limited in the grooves 132 to prevent the hook portion 113 from rotating relative to the inner edge of the second opening 131, so that the first portion 11 is more stably connected to the second portion 13.

In addition, an inner edge of the first portion 11 adjacent to the first opening 111 may further have an inclined surface 114 located on upper edges of the connecting portion 112 and the elastic portion 12, and is adapted for guiding the buckling portion 22 to be aligned to a central of the first opening 111 when the buckling portion 22 is adapted for passing through the first opening 111. During assembling of the first housing 4 to the second housing 3, if the buckling portion 22 of the fixing member 2 is in contact with the inclined surface 114 located at the inner edge of the first opening 111, a horizontal component of a force between the buckling portion 22 and the inclined surface 114 causes the fastener 1 to horizontally move relative to the second housing 3 within the range of the gap G, so that the buckling portion 22 is aligned to the center of the first opening 111, further improving assembling quality of the housings.

In this embodiment, the connecting portion 112 and the second portion 13 may be made of different materials due to being not integrally formed but being different components. Those skilled in the art may adopt different materials for the first portion 11 and the second portion 13 based on actual application conditions such as different friction coefficients, different mechanical strengths, and the like. In addition, the second housing 3 may alternatively be not provided with the guide groove 34 to improve strength of the second housing 3. If the guide groove 34 is not provided, during assembling, the second portion 13 may be first disposed on the second surface 32 of the second housing 3, then the first portion 11 is disposed on the first surface 31, and after the connecting portion 112 passes through the through hole 33, the hook portion 113 is hooked to the groove 132 at the inner edge of the second opening 131 to dispose the fastener 1 in the through hole 33 of the second housing 3.

Based on the above, although the present disclosure is disclosed above by using embodiments, the embodiments are not intended to limit the present disclosure. Those with ordinary knowledge in the art to which the present disclosure belongs can make various changes and refinements without departing from the spirit and scope of the present disclosure. Therefore, the protection scope of the present disclosure shall be subject to scope defined by the attached claims.

What is claimed is:

1. A fastener, comprising:
   a first portion comprising a first opening, an inner edge and an inclined surface, wherein the inner edge is between the first opening and the inclined surface, and the inclined surface is a continuous surface;
   at least one connecting portion located at the first opening, wherein one end of the at least one connecting portion is connected to the inner edge of the first portion;
   at least two elastic portions inclinedly extending into the first opening from the inner edge of the first portion; and
   a second portion disposed at another end of the at least one connecting portion.

2. The fastener according to claim 1, wherein the connecting portion and the second portion are integrally formed.

3. The fastener according to claim 1, wherein the another end of the connecting portion is a hook portion, the second portion further comprises a second opening, the second opening is in communication with the first opening, and the hook portion is adapted for being hooked to an inner edge of the second portion through the second opening.

4. The fastener according to claim 3, wherein the second portion further comprises at least one groove located at the second opening, and the hook portion is hooked to the second portion through the groove.

5. The fastener according to claim 1, wherein the first portion and the second portion are made of different materials.

6. A housing device, comprising:
   a first housing provided with a protruding portion and a buckling portion, wherein the buckling portion is located at an end of the protruding portion;
   a second housing having a first surface, a second surface, and a through hole, wherein the second surface is opposite to the first surface, and the through hole passes through the first surface and the second surface; and
   a fastener disposed at the second housing corresponding to the through hole, wherein the fastener comprises:
   a first portion movably abutting against the first surface and comprising a first opening, an inner edge and an inclined surface, wherein the inner edge is between the first opening and the inclined surface, the inclined surface is a continuous surface, and the first opening is in communication with the through hole;
   at least one connecting portion located at the first opening and accommodated in the through hole, wherein one end of the at least one connecting portion is connected to the inner edge of the first portion, the at least one connecting portion is spaced apart from an inner edge of the second housing by a gap, and the fastener is movable in the through hole relative to the inner edge of the second housing to change relative positions of the fastener and the inner edge of the second housing;

at least two elastic portions inclinedly extending into the first opening from the inner edge of the first portion; and a second portion movably abutting against the second surface and disposed at another end of the at least one connecting portion, wherein the second portion and the first portion are jointly clamped on the second housing, wherein during assembling of the first housing to the second housing, the buckling portion pushes the fastener to move along the gap, the first opening is aligned to the buckling portion, the buckling portion is allowed to pass through the elastic portions, and after the buckling portion passes through the elastic portions, the elastic portions return and are clamped on the protruding portion.

7. The housing device according to claim 6, wherein the connecting portion and the second portion are integrally formed.

8. The housing device according to claim 6, wherein the another end of the connecting portion is a hook portion, the second portion further comprises a second opening, the second opening is in communication with the first opening and the through hole, and the hook portion is adapted for being hooked to an inner edge of the second portion through the second opening.

9. The housing device according to claim 8, wherein the second portion further comprises at least one groove located at the second opening, and the hook portion is hooked to the second portion through the groove.

10. The housing device according to claim 6, wherein the first portion and the second portion are made of different materials.

11. The housing device according to claim 6, wherein the second housing further comprises a guide groove, the guide groove is in communication with the through hole and is adapted for allowing the at least one connecting portion to laterally access the through hole, and the first portion and the second portion are jointly clamped on the second housing.

* * * * *